Aug. 13, 1957 — J. F. BOLTON — 2,802,647
AERATION APPARATUS
Filed Oct. 24, 1952 — 3 Sheets-Sheet 1

Inventor
James F. Bolton
By Evans, Blaister & Anderson
Attorneys

Aug. 13, 1957　　J. F. BOLTON　　2,802,647
AERATION APPARATUS
Filed Oct. 24, 1952　　3 Sheets-Sheet 2

Inventor
James F. Bolton
By
Evans, Glaister & Anderson
Attorneys

Aug. 13, 1957  J. F. BOLTON  2,802,647
AERATION APPARATUS
Filed Oct. 24, 1952  3 Sheets-Sheet 3
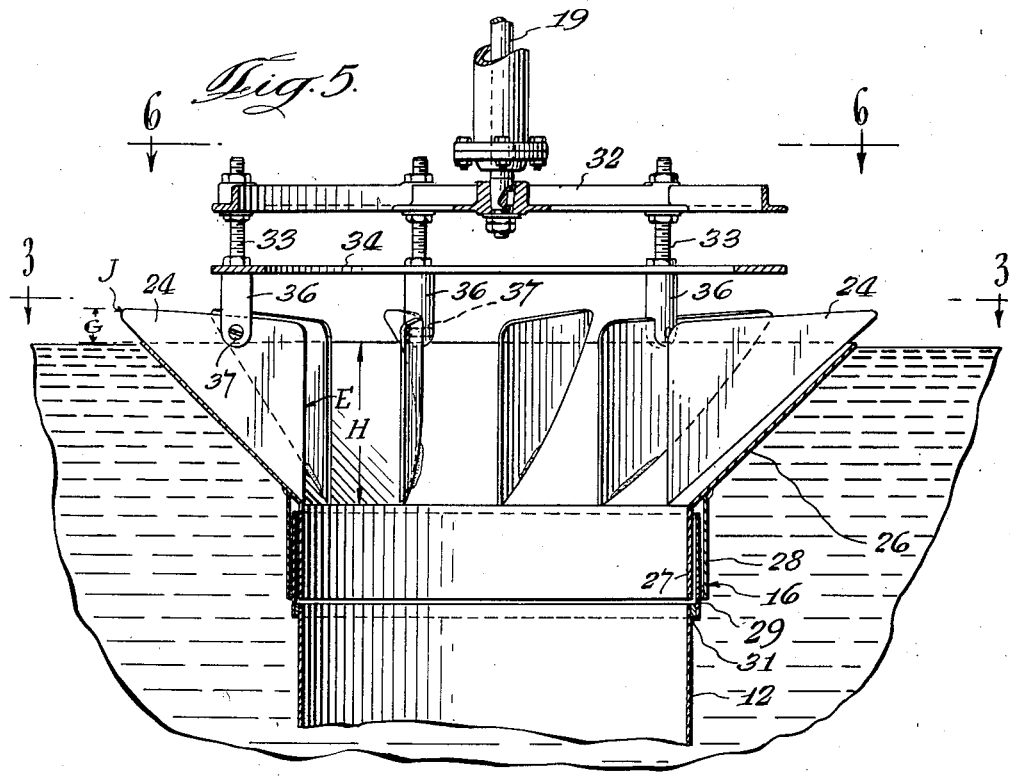
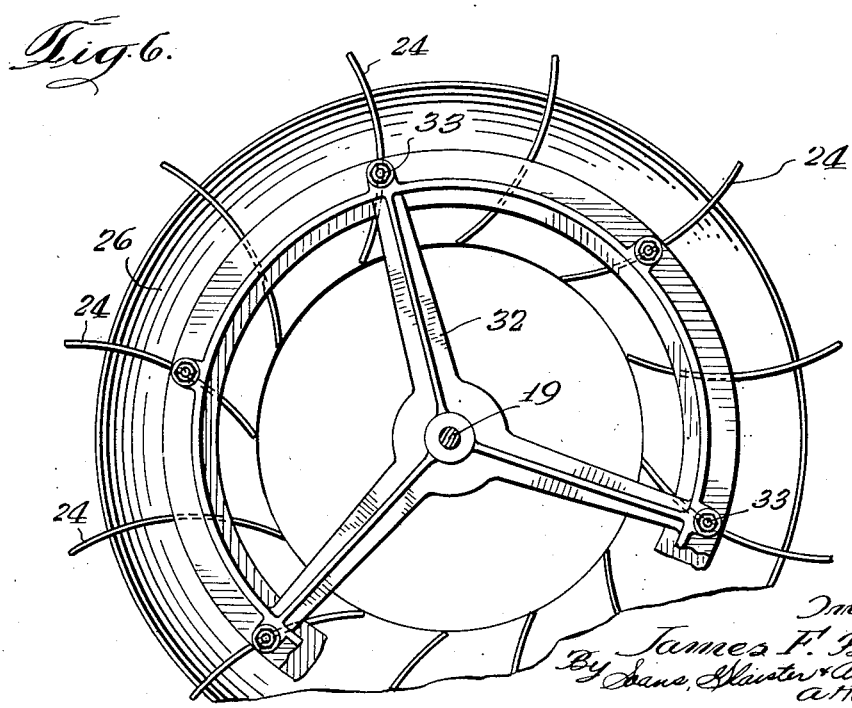
Inventor
James F. Bolton
By Ivans, Kiester & Anderson
Attorneys United States Patent Office 2,802,647
Patented Aug. 13, 1957

2,802,647

AERATION APPARATUS

James F. Bolton, Heywood, England

Application October 24, 1952, Serial No. 316,745

3 Claims. (Cl. 259—8)

The present invention is concerned with aeration apparatus and in particular with aeration apparatus employed in the treatment of sewage by the activated sludge process.

In the activated sludge process, the raw sewage is first treated to effect removal of settleable solids, as by screening or settling, and the supernatant liquid recovered from this initial or primary treating is then inoculated with a bacteria-containing or "activated" sludge obtained from the previous treatment of sewage, following which it is subjected to an aeration operation to promote the growth of the bacteria introduced thereinto by the sludge. The aeration is usually accomplished in an aeration tank, and two types of aeration apparatus have been used quite extensively in the past to effect aeration of the mixture being treated.

One of these mechanisms makes use of plates or other bodies of porous material, such as fused silicon carbide, through which air is forced under substantial pressure. This type of mechanism, while producing very satisfactory aeration, at least when the porous plates are new, requires very considerable amounts of power, elaborate filtering mechanisms for removing dust and dirt from the air, and is subject to the serious operational disadvantage that the plates or other porous material bodies become clogged during use.

The other type of aeration apparatus is of the mechanical agitation type, and involves the use of a power-driven, mechanical aerator, frequently described as an aeration cone. In the use of this type of equipment, the aerator rotor, which is generally conical in shape and is provided with a series of vanes or blades, is mounted centrally of the aeration tank so as to connect with a downwardly extending draft tube. Rotation of the cone draws liquid through the draft tube and spreads the liquid over the tank surface. An example of such structure is shown and described in Yeomans Patent No. 2,323,437.

The rotary cone type of aeration mechanism is particularly desirable in that its operation is inherently very reliable and not subject to changes over its operative life. Also, it is very much less expensive than the porous plate arrangements both as to original cost and as to maintenance. The rotary cone aerator has not, however, proven as efficient as the porous plate structures, i. e. for a given size of tank and a given power consumption, porous plate treating mechanisms will effect a given biological oxygen demand (B. O. D.) reduction in a given amount of material under treatment in a lesser period of time than existing rotary cone designs.

The present invention is concerned with the improvement of rotary cone type aeration mechanisms, and has for its primary object the provision of a rotary cone mechanism which shall equal or surpass in efficiency the operation of any known types of aeration mechanism.

As will hereinafter appear, this object is accomplished by the provision of an aeration cone structure which differs materially in its design and operational characteristics from the structures heretofore known in the art and which, because of such differences, is operable at a much higher rate of efficiency than any of the prior, known arrangements.

Heretofore in the design of rotary cone aerators, it has been considered necessary to shape the cone portion of such structures so that the liquid will be discharged therefrom in the form of a relatively thin, dispersed stream which is directed across a very considerable portion of the surface of the tank with which the cone is being used. It has also been considered important that the stream of liquid produced by the cone should be discharged from the cone structure with a relatively flat trajectory, this causing the stream to strike the surface of the liquid in the tank with a skimming contact, and it has been customary to circulate the contents of the tank through the cone at a rate of about once in each 20 to 30 minutes.

The obtaining of these several operating characteristics has required the use of conically-shaped, blade support members which are relatively flat in form, and correlation of the relative dimensions of the cones and the tanks wherein the cones are used, and the power input to the cones. To illustrate, when using cones of the more commonly used sizes, i. e., cones having a diameter of from 5 to 6 feet, and tanks having a capacity within the range of from 20,000 to 100,000 gallons, the attainment of the desired stream discharge characteristics at the desired circulation rate has required that the cones be rotated at speeds within the range of from about 40 to 50 R. P. M. and that power be delivered to the cones at rates within the range of from about 3 to 10 horsepower.

Contrary to these previously accepted practices, the present invention is based, in large part, upon the discovery that substantially improved results can be obtained if the aeration cones are designed to discharge the liquid material passing therethrough as a relatively thick stream, or cascade, which flows from the cone with a pouring action rather than as a thin, dispersed stream. The utilization of cones in accordance with the invention increases the aerating capacity of tanks wherein they are used very materially and at the same time makes possible important saving in the amount of power required.

In cone structures in accordance with the invention, the conically-shaped, blade support member and the vanes secured to that member are of special design and contour and are positioned in particular relation to each other. More particularly, the vane support member is inclined at a much greater angle than in the case of the prior structures, and vanes are of different contour and dimensions and are arranged differently on the support. It has been observed that the apparatus, during operation, greatly increases the turbulence of the material contained in the tank, as compared with the prior structures, and this is believed to be a very important feature of the improved operation resulting from use of the invention. Among other things, the increased turbulence in the tank appears to minimize any tendency for sludge to settle on the bottom of the tank and become septic, or to flocculate into large masses.

The thick stream of relatively large volume which is produced during the operation of the apparatus of the invention has a short, steep trajectory, and it strikes the surface of the liquid contained in the tank in a region which is much closer to the cone periphery, and hence farther from the edge of the tank, than the streams produced by prior aeration cones, which distribute the sewage as a thin, flat stream.

Other and more specific objects of the invention and various of the features of the invention will be made apparent in the accompanying drawings and the following description of certain preferred embodiments thereof, In the drawings:

Figure 5 is a fragmentary side elevational view, partially in section, of the cone and vane structure; and Figure 6 is a cross-sectional view taken substantially along the line 6—6 of Figure 5.

Figure 1:
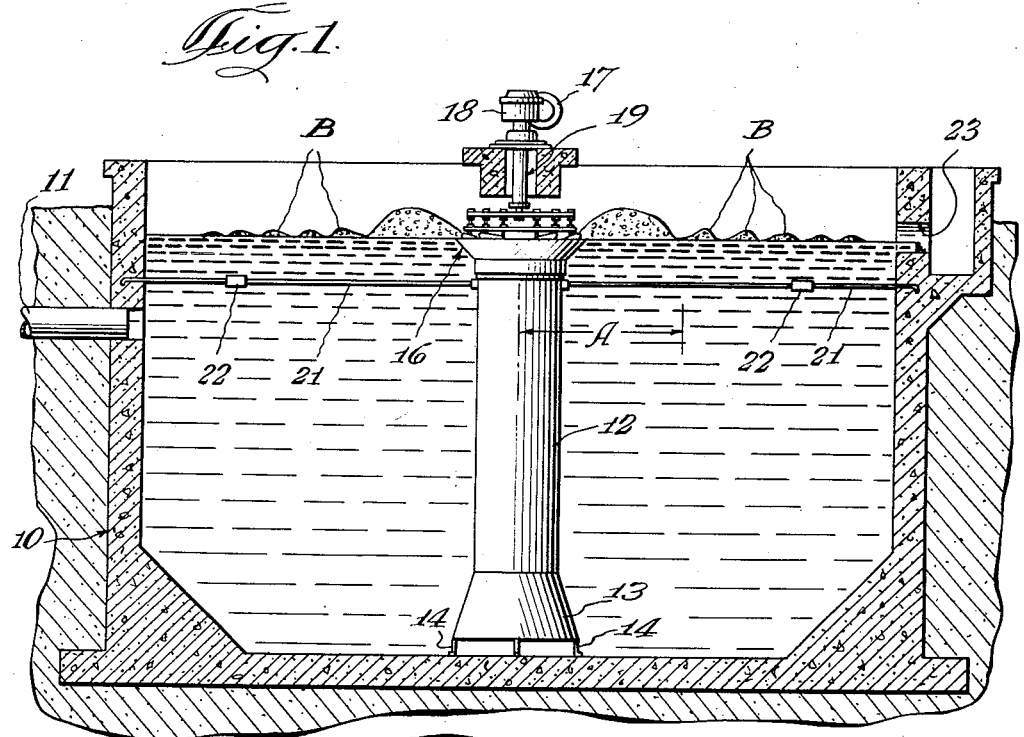
Figure 1 is a view in elevation and partially in cross section illustrating an aeration tank provided with an improved aeration cone in accordance with the present invention.

In Figure 1, reference numeral 10 indicates generally an aeration tank made of concrete or the like into which a mixture of sewage and sludge is introduced through an inlet pipe 11.

Usually the tank will be square, and its capacity will be related to the size of the cone used therein and to the amount of power available to drive the cone. The bottom of the tank will be inclined in order that sludge will tend to settle toward the central portion thereof. Supported centrally of the tank 10 is a hollow uptake or draft tube 12 having a bell-shaped lower end 13 supported in spaced relation to the floor of the tank 10 by means of spaced supports 14. At the top of the uptake tube 12 is an aerator cone assembly generally indicated at 16, the cone 16 being driven from a motor 17 through a gear box 18 and a depending shaft assembly 19.

The uptake tube 12 is supported centrally of the tank 10 by means of stay bolts 21 whose tension may be adjusted by means of turnbuckles 22.

The mixture of sewage and sludge entering through the pipe 11 is constantly circulated within the tank as a result of being drawn into the uptake tube 12 through the bell-shaped base portion 13. As the mixture rises in the uptake tube 12, it is subjected to the rotating action of the aerator cone assembly 16. Because of the design of the cone and vane assembly, as will hereinafter be explained, the mixture flows out of the aerator cone structure 16 in the form of a thick stream, of relatively large volume having a short, steep trajectory, the action being similar to pouring. The rate of rotation of the aerator cone structure is adjusted so that the maximum throw of the liquid from the aerator cone, indicated at A in Figure 1, does not substantially exceed the diameter of the cone, and is less than one-third the distance from the center of the rotating cone to the outer wall of the tank. As previously stated, the relatively large volume of discharge provided by the unique design of the aerator cone not only provides very efficient aeration of the sewage, but in addition, it effects rapid circulation of the material through the tank under conditions of high turbulence. Normally the contents of the aeration tank are circulated at a rate of about once every 10 minutes, whereas, in the prior structures a time of 20 to 30 minutes is ordinarily required to provide complete circulation of the contents of the tank through the cone.

During operation, a part of the treated liquid may be continuously removed from the aeration tank 10 and conveyed to a settling tank where the sludge is separated from the liquid, after which at least a portion of the settled sludge may be recovered and used to inoculate additional amounts of sewage.

Figure 2:
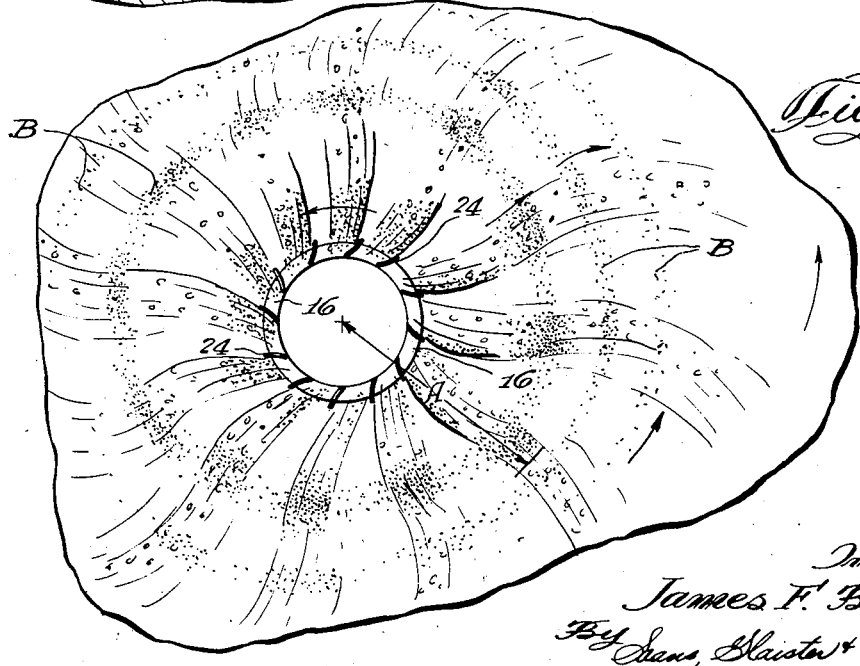
Figure 2 is a diagrammatic plan view of the aeration cone and vane structure of Figure 1, illustrating the manner in which the liquid streams pour from the flow directing vanes.

The path of the fluid streams as they leave the rotating cone assembly 16 is best illustrated in the diagrammatic drawing of Figure 2. As seen in this figure, the aeration cone assembly 16 contains a plurality of circumferentially spaced distributing vanes 24, the design of which is instrumental in securing the proper flow characteristics of the stream leaving the aerator cone. As will hereinafter be explained more completely, each of the vanes 24 is proportioned and shaped so as to grip the liquid and to propel it by centrifugal action into a cascade of liquid of relatively large flow and with a short, steep trajectory.

Figure 3:
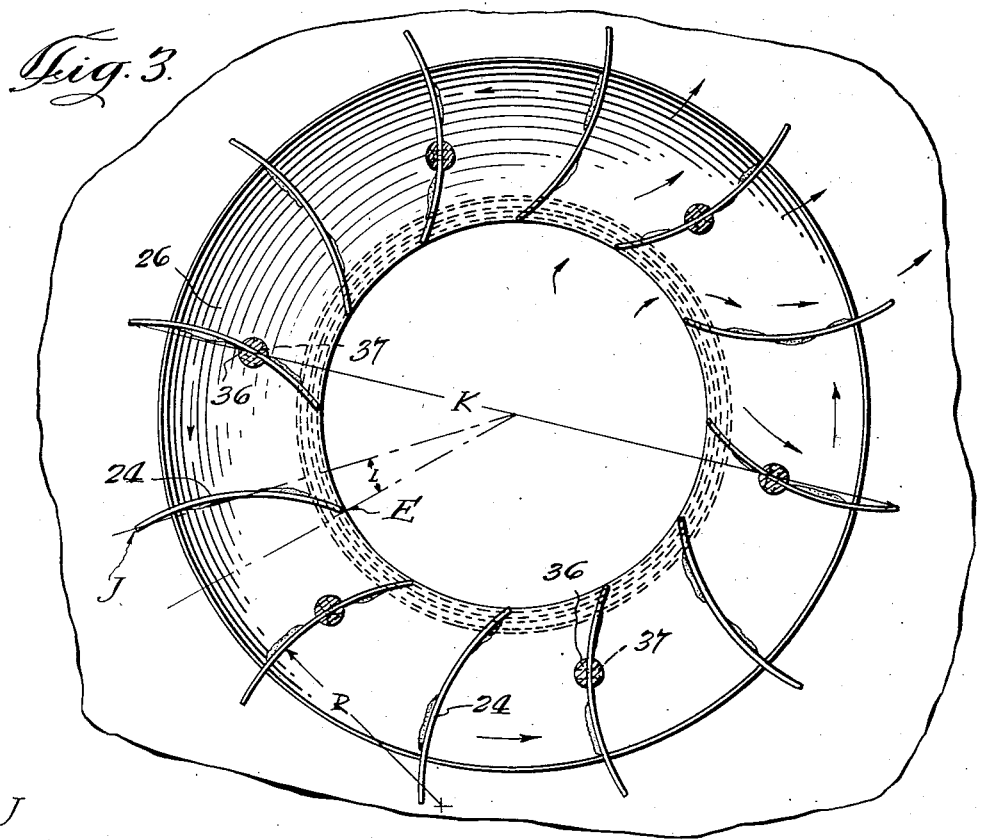
Figure 3 is a sectional view taken along the line 3—3 of Figure 5.

The manner in which the aerator cone assembly 16 is secured to the drive means is best illustrated in Figures 3, 5, and 6 of the drawings. The aerator cone assembly 16 includes a frusto-conical vane supporting surface 26 which is more nearly vertical than the more conventional cones now employed in similar apparatus. For the purposes of this invention, the vane supporting surface 26 should be inclined to the horizontal by an angle of at least 40° and preferably at an angle from 40 to 60°.

At its base, the aerator cone assembly 16 is provided with a collar 27 and a concentric ring 28 spaced from the collar 27 and welded or otherwise secured to the vane supporting surface 26. As best seen in Figure 5, the lower edge of the collar 27 terminates short of the top of the uptake tube 12. An air seal is provided between the rotating aerator cone and the uptake tube 12 by means of a ring 29 secured to the uptake tube 12 through a spacer ring 31 and received in the annular space between the collar 27 and the ring 28.

The aerator cone assembly 16 is supported for rotation from the shaft 19 by means of a drive ring or spider 32 which is keyed to the shaft 19. Circumferentially spaced about the periphery of the drive ring 32 are a plurality of adjusting studs 33 which support a baffle plate 34. The studs 33 each have lugs 36 which engage alternate vanes 24 on the vane supporting surface, each of the lugs 36 receiving a bolt or rivet 37 therethrough as best seen in Figures 3 and 5.

The design and spacing of the vanes 24 forms an important part of the present invention, as the shape and dimensions of the vanes 24 provide the improved circulation and aeration possessed by the aerator cone structure. As best seen in Figure 3, each of the vanes 24 is curved about a cylindrical surface of uniform radius R, the axes of generation of the curved surfaces being parallel to the axis of the aerator cone assembly 16. Each of the vanes 24 is thus a segment of a right circular cylinder of radius R. To secure the improved results with the cone assemblies of the present invention, the radius R should be from 20 to 35 percent of the effective diameter of the cone structure, i. e. the distance from the outermost tip of one vane to the outermost tip of a diametrically opposite vane, this dimension being represented by the reference letter "K" in Figure 3 of the drawings. As previously stated the effective diameter of the cone structure, in turn is not more than 1/3 the diameter or maximum width of the tank and at the same time these dimensions are interrelaetd since the diameter of the cone structure is closely related to the liquid capacity of the tank with which it is used. Generally, a cone 5 feet in diameter is suitable for use in aeration tanks having a capacity of from about 20,000 to 45,000 gallons and a cone 6 feet in diameter is suitable for use in tanks having a capacity of from about 45,000 to 100,000 gallons. The cone dimensions versus tank capacities are thus generally similar to the prior structures.

Figure 4:
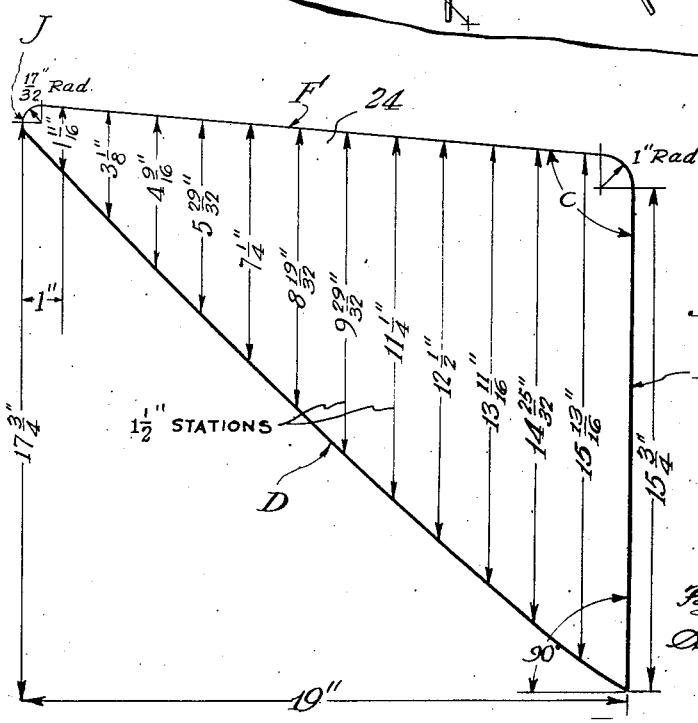
Figure 4 represents a development of one of the vanes employed in the distributing structure shown in the other figures of the drawings.

The preferred shape of the vanes is illustrated in the developed view of Figure 4, illustrating a vane 24 before the vane is curved along the radius R. Actual dimensions have been included in the showing of Figure 4 to better illustrate the particular shape involved. These dimensions are suitable for vane structures employed with 6-foot cones, that is, where the distance K from the outermost tip of one vane is approximately 6 feet from the outermost tip of a diametrically opposite vane. As apparent from an inspection of Figure 4, each of the vanes 24 is generally triangular in shape and includes an obtuse angle C opposite the longest slightly convex side D of the triangle. The side D is secured to the vane supporting surface 26 by welding or the like, with the leading vertical edge E of the vane intersecting the inner periphery of the cone 16. The side D is longer than the vane supporting surface 26 and projects therebeyond as indicated in Figure 5. The vertical side of the triangle, the leading vertical edge E, is also longer than the truncated height H of the vane supporting surface 26 so that the top surface of the triangle F extends above the top of the vane supporting surface 26, as clearly indicated in Figure 5. The extent to which the side F projects above the vane supporting surface 26 is quite critical for the best results, and should be so adjusted that the tip of the trailing edge extends above the support by at least 10 percent of the projected height of the vane support between the upper and lower defining planes of that support. This is illustrated in Figure 5 where the letter G represents the vertical distance between the tip or trailing vertical edge J of the vane 24 and the outer edge of the vane supporting surface 26. As previously noted, the distance G should be at least 10 percent of the distance H and is preferably 15 to 20 percent of that distance.

An important factor in securing the proper dispersion characteristics is the adjustment of the angular position of the vanes 24 on the vane supporting surface 26. If the vanes 24 are not positioned at the proper radial angle, with respect to the vane supporting surface, the liquid will not be propelled into the tank sufficiently far to effect adequate aeration, or the liquid will emerge from the vanes as a fine stream and the intense agitation effects desired will not be achieved. From experiment, it has been determined that for proper dispersion characteristics, the radial angle L (Figure 3) between the leading vertical edge E of a vane and the trailing vertical edge J of a vane measured between radii of the cone intersecting these edges should be within the range of 10° to 20°, and preferably within the narrow range of 11° to 15°. In the vertical plane, elements of the vane surfaces are parallel to the vertical axis of the cone.

Another important feature in design of the vanes is the variation in vertical height between the tip or trailing edge of the vane and the leading edge of the vane, which is opposite to the tip end. For best results, the side D of the vane is slightly curved convexly such that the difference of vertical dimension between two vertical lines spaced by a given increment at the tip end of the vane is greater than the difference of vertical dimension between two vertical lines spaced by the same increment near the leading edge of the vane, which is opposite to the tip. This is illustrated in Figure 4 by the dimensions along the vane. For purposes of illustration, the vane 24 has been divided into increments each measuring 1½ inches along the width of the vane. Progressing from the tip end or trailing edge J of the vane to the leading edge, side E, the difference in vertical dimension between two adjacent increments in general becomes greater, or at least no less than the difference in vertical dimension between previous increments. For example, at a distance of approximately 1 inch from the tip end of the vane, the vertical dimension is 1 and 11/16 inches, while the vertical dimension at the next increment is 3 and ⅛ inches. The difference between these vertical dimensions is 1 and 7/16 inches. At the opposite end of the vane, however, the two vertical dimensions spaced by the same increment are 14 and 25/32 inches and 15 and 13/16 inches. Hence, the difference at this end of the vane is only 1 and 1/32 inches. This characteristic of the vane forms an important feature of the design of the vane, as it permits the liquid to be poured across the surface of the vane in a short, steep trajectory, which is instrumental in obtaining the improved results with the aerator cone of the present invention.

As previously mentioned, the use of the particular cone and vane assembly described permits the drive means to be operated at lower velocities than heretofore employed for aeration. Where previously the minimum velocity for aerator cones was on the order of 40 R. P. M., with the improved design of the present invention these velocities under similar conditions of operation can be substantially reduced. For example, when operating a cone of 5 feet in diameter, in conjunction with a tank having a capacity of 30,000 gallons, most efficient operation occurs at velocities 24 to 25 revolutions per minute. In the case of a cone 6 feet in diameter, when used in conjunction with a tank having a capacity of 50,000 gallons, the velocity range is from 23 to 25 revolutions per minute.

As previously noted, there is an optimum relationship between the dimensions of the tank, the dimensions of the cone and the rate at which power is supplied to the apparatus: Cones which are 5 feet in diameter are suitable for use in tanks having a volume within the range of from about 20,000 to 45,000 gallons. If the tank is square, which is the usual shape, the dimensions of the tank may be from about 18 to 24 feet on each side, although so long as there is adequate space for the operation of the aerator, the horizontal peripheral dimensions of the tank are not too critical. For tanks having a volume within the range of from about 45,000 to 100,000 gallons, a 6-foot diameter cone will be found satisfactory. The horsepower input to the cones will vary, from about 1 to 7.5 horsepower, depending upon the rate of circulation desired and the condition of the sewage being treated.

From the foregoing, it will be appreciated that the aeration cone assembly of the present invention is designed for maximum efficiency and provides for maximum treatment capacity on an aeration tank of a given size. The rapid circulation of the liquid through the cone assembly also increases the relative turbulence with the result that any tendency for the sludge to settle on the bottom of the tank is minimized.

It will be evident that various other changes can be made in various details of the construction without departing from the scope of the present invention, and it is not my intention to limit the invention to the particular form illustrated and described but only as limited by the scope of the appended claims.

I claim:

1. An aeration assembly comprising a tank including an inlet for liquid-borne materials, an outlet for said tank disposed above the level of said inlet, a tubular member disposed generally centrally of said tank and affording fluid communication between a lower portion of the tank and the upper level of the liquid therein, a frusto-conical member mounted on the upper portion of said tubular member for rotation relative thereto, the upper edge of said frusto-conical member being disposed at the level of said tank outlet, said frusto-conical member having a vane supporting surface inclined to the horizontal by an angle of at least 40 degrees and including thereon a plurality of circumferentially spaced vanes which extend upwardly from said vane supporting surface, said vanes being generally triangular-shaped segments of right-circular cylinders of equal radii whose axes are parallel to the axis of said frusto-conical member, each of said vanes being disposed so that the radial angle between the leading vertical edge and the trailing vertical edge of the vane, as measured between radii of said frusto-conical member, is between about 10 to 20 degrees, with said vanes having uniform radii of curvature measuring from about 20 to 35 percent of the distance from the trailing edge of one vane to the trailing edge of a diametrically opposite vane, and the upper edge of each vane having its entire length projecting above the upper edge of said frusto-conical member with the trailing tip of each of said vanes projecting above said frusto-conical member by an amount equal to at least 10 percent of the height of the vane supporting surface as measured along its axis.

2. An aeration assembly comprising a tank including an inlet for liquid-borne materials, an outlet for said tank disposed above the level of said inlet, a tubular member disposed generally centrally of said tank and affording fluid communication between a lower portion of the tank and the upper level of the liquid therein, a frusto-conical member mounted on the upper portion of said tubular member for rotation relative thereto, the upper edge of said frusto-conical member being disposed at the level of said tank outlet, said frusto-conical member having a vane supporting surface inclined to the horizontal by an angle of between 40 degrees and 60 degrees and including thereon a plurality of circumferentially spaced vanes which extend upwardly from said vane supporting surface, each of said vanes being generally triangular-shaped to include an obtuse angle and comprising a segment of a right-circular cylinder whose axis is parallel to the axis of said frusto-conical member, said vanes having uniform radii of curvature measuring from about 20 to 35 percent of the distance from the trailing edge of one vane to the trailing edge of a diametrically opposite vane, the upper edge of each vane having its entire length projecting above the upper edge of said frusto-conical member with the trailing tip of each of said vanes projecting above said frusto-conical member by an amount equal to at least 10 percent of the height of the vane supporting surface as measured along its axis, and the upper edge of each vane being curved so that the difference in vertical dimension between two vertical lines spaced by a given increment at the trailing tip end of the vane is greater than the difference in vertical dimension between two vertical lines spaced by the same increment near the leading edge of said vane.

3. An aeration assembly comprising a tank including an inlet for liquid-borne materials, an outlet for said tank disposed above the level of said inlet, a tubular member disposed generally centrally of said tank and affording fluid communication between the lower portion of the tank and the upper level of the liquid therein, a frusto-conical member mounted on the upper portion of said tubular member for rotation relative thereto, the upper edge of said frusto-conical member being disposed at the level of said tank outlet, and said frusto-conical member having a vane supporting surface inclined to the horizontal by an angle of between 40 degrees and 60 degrees and including thereon a plurality of circumferentially spaced vanes which extend upwardly from said vane supporting surface, each of said vanes being generally triangular-shaped to include an obtuse angle and comprising a segment of a right-circular cylinder whose axis is parallel to the axis of said frusto-conical member, each of said vanes being disposed so that the radial angle between the leading vertical edge and the trailing vertical edge of the vane, as measured between radii of said frusto-conical member, is between about 10 to 20 degrees, said vanes having uniform radii of curvature measuring from about 20 to 35 percent of the distance from the trailing edge of one vane to the trailing edge of a diametrically opposite vane, the upper edge of each vane having its entire length projecting above the upper edge of said frusto-conical member, with the trailing tip of each of said vanes projecting above said frusto-conical member by an amount equal to at least 10 percent of the height of the vane supporting surface measured along its axis, and the upper edge of each vane being curved so that the difference in vertical dimension between two vertical lines spaced by a given increment at the trailing tip end of the vane is greater than the difference in vertical dimension between two vertical lines spaced by the same increment near the leading edge of said vane.

References Cited in the file of this patent

UNITED STATES PATENTS

| 2,054,395 | Streander | Sept. 15, 1936 |
| 2,077,907 | Streander | Apr. 20, 1937 |
| 2,165,889 | Fischer et al. | July 11, 1939 |

FOREIGN PATENTS

| 225,076 | Great Britain | Dec. 17, 1923 |
| 602,130 | Great Britain | May 20, 1948 |